(12) United States Patent
Sugiyama et al.

(10) Patent No.: US 6,597,966 B2
(45) Date of Patent: Jul. 22, 2003

(54) MACHINE TOOL DRIVING CONTROL APPARATUS

(75) Inventors: Tetsuya Sugiyama, Shizuoka (JP); Takehisa Kajiyama, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 279 days.

(21) Appl. No.: 09/776,752

(22) Filed: Feb. 6, 2001

(65) Prior Publication Data
US 2001/0029404 A1 Oct. 11, 2001

(30) Foreign Application Priority Data
Feb. 7, 2000 (JP) ........................................ 2000-029251

(51) Int. Cl.⁷ .............................................. G06F 19/00
(52) U.S. Cl. ..................... 700/183; 170/160; 170/161
(58) Field of Search ................................ 700/160–183, 700/90, 195; 318/560–569; 408/124–137

(56) References Cited

U.S. PATENT DOCUMENTS

| | | | | |
|---|---|---|---|---|
| 3,857,025 A | * | 12/1974 | English et al. ............... | 700/160 |
| 4,672,550 A | * | 6/1987 | Winterbottom et al. ...... | 700/183 |
| 5,231,587 A | * | 7/1993 | Frost ........................... | 700/164 |
| 5,751,585 A | * | 5/1998 | Cutler et al. ................. | 700/161 |

* cited by examiner

Primary Examiner—Albert W. Paladini
Assistant Examiner—Walter R. Swindell
(74) Attorney, Agent, or Firm—Morgan, Lewis & Bockius LLP (57) ABSTRACT

Every time the cumulative number of revolutions of a spindle rotating motor reaches a cumulative number of revolutions set in a data table, a CPU reads out, from a data memory section, moving positions of a workpiece and tool at the reached cumulative number of revolutions and the next cumulative number of revolutions, and a spindle rotational speed instruction value at the reached cumulative number of revolutions. The CPU sets the reached cumulative number of revolutions as a start point and the next cumulative number of revolutions as an end point, and divides the interval between the start and end points at predetermined timings. The CPU determines moving positions of the workpiece and tool at divided timings on the basis of the readout moving positions of the workpiece and tool. The CPU outputs the spindle rotational speed instruction value as a spindle rotational speed instruction signal to a reference spindle rotational speed setting circuit to control the rotational speed of the spindle rotating motor.

3 Claims, 6 Drawing Sheets

| CUMULATIVE NUMBER θ OF REVOLUTIONS | MOVING POSITION Zp OF WORKPIECE | MOVING POSITION Xp OF TOOL | SPINDLE ROTATIONAL SPEED INSTRUCTION VALUE |
|---|---|---|---|
| 0 | 0 | 0 | 3000 |
| 50 | 0 | 1 | 4000 |
| ⋮ | ⋮ | ⋮ | ⋮ |
| 200 | 1 | 2 | 5000 |
| 350 | 3 | 2 | 4000 |
| 600 | 7 | 4 | 3000 |
| ⋮ | ⋮ | ⋮ | ⋮ |

SPINDLE ROTATIONAL SPEED INSTRUCTION VALUE

*Fig.6B*

REFERENCE SPINDLE ROTATIONAL SPEED SIGNAL

*Fig.6C*

SPINDLE ROTATIONAL SPEED SIGNAL

*Fig.6D*

MOVING POSITION OF WORKPIECE

*Fig.6E*

MOVING POSITION OF TOOL

*Fig.6F*

MACHINE TOOL DRIVING CONTROL APPARATUS

BACKGROUND OF THE INVENTION

1. Field of the Invention

The present invention relates to a machine tool driving control apparatus for rotating a workpiece about a predetermined axis, and moving at least one of the workpiece and a tool for machining the workpiece, thereby machining the workpiece into a desired shape.

2. Related Background Art

In general, a machine tool driving control apparatus of this type has a controller for controlling driving of a spindle rotating motor for rotating a spindle capable of holding a workpiece, a tool moving motor, a workpiece moving motor, and the like. When a workpiece (spindle) is to be rotated and machined (e.g., cut), the controller controls driving of the spindle rotating motor so as to set the rotational speed of the workpiece (spindle) during machining the workpiece in order to keep machining conditions as constant as possible. For example, when the diameter of a machined (cut) portion of a workpiece rotated at a constant speed gradually increases, the peripheral speed of the workpiece also increases. Assuming that the moving speed of the tool is constant, the relative moving speed between the workpiece and the tool increases to change the machining (cutting) speed by the tool. Therefore, when the diameter of a workpiece at a machined (cut) position changes, the rotational speed of the workpiece (spindle) is changed in accordance with the change in diameter so as to machine the workpiece under the same conditions.

As described above, when the rotational speed of a workpiece (spindle) is changed to a predetermined one during machining, or a workpiece (spindle) is to be rotated at a desired rotational speed in order to start machining, a long time is taken before variations in the rotational speed of the workpiece (spindle) settle, and the rotational speed of the workpiece (spindle) converges to a predetermined one. The controller controls the tool moving motor and workpiece moving motor so as to stand by without any machining operation until the rotational speed of the workpiece (spindle) stabilizes to a predetermined one. For example, the controller determines upon the lapse of a predetermined time that variations in rotational speed settle, and controls to start machining by the tool. The controller detects the rotational speed of a workpiece (spindle), and when the detected rotational speed falls within a predetermined threshold range, controls to start machining by the tool.

However, if machining operation stands by until the rotational speed of a workpiece (spindle) converges to a predetermined one, as described above, a time until the tool moving motor and workpiece moving motor are driven to actually machine the workpiece by the tool is wasteful. This prolongs the machining time to decrease the productivity. Even if a standby time till the start of machining, or the threshold of a machining start rotational speed is strictly determined by experiment or the like, it is limited to shorten a time until the tool actually machines a workpiece. In this manner, a conventional machine tool driving control apparatus cannot increase the productivity.

SUMMARY OF THE INVENTION

The present invention has been made in consideration of the above situation, and has as its object to provide a machine tool driving control apparatus capable of rapidly, efficiently machining a workpiece, and increasing the productivity without decreasing the machining accuracy of the workpiece by a tool.

According to the present invention, a machine tool driving control apparatus for rotating a workpiece about a predetermined axis, and moving at least one of the workpiece and a tool for machining the workpiece, thereby machining the workpiece into a desired shape is characterized by comprising workpiece rotational speed changing means for changing a rotational speed of the workpiece about the predetermined axis into a predetermined rotational speed, and moving position determining means for determining a moving position of at least one of the workpiece and the tool every predetermined rotational angle with respect to the predetermined axis, wherein upon a rotational speed change in which the rotational speed about the predetermined axis is changed, at least one of the workpiece and the tool is moved on the basis of the moving position determined by the moving position determining means.

The machine tool driving control apparatus according to the present invention comprises the workpiece rotational speed changing means and moving position determining means, and moves at least one of the workpiece and tool on the basis of a moving position determined by the moving position determining means. In the machine tool driving control apparatus according to the present invention, the moving position of at least one of the workpiece and tool is determined in correspondence with a predetermined rotational angle of a predetermined axis. Even while the workpiece rotational speed changing means modifies the rotational speed of the workpiece about the predetermined axis to a predetermined one, and the rotational speed of the workpiece about the predetermined axis changes, the workpiece can be machined without decreasing the machining accuracy of the workpiece by the tool. Consequently, the workpiece can be machined by the tool even within a time during which machining must stand by in the prior art. machining can be rapidly, efficiently done to increase the productivity.

The machine tool driving control apparatus according to the present invention may be characterized in that the apparatus further comprises reference timing signal generating means for generating a reference timing signal every predetermined rotational angle with respect to the predetermined axis, reference timing signal counting means for counting the number of times of generation of reference timing signals, position data memory means for storing position data which are respectively set in correspondence with count values of a plurality of different numbers of times of generation, and representing moving positions of at least one of the workpiece and the tool, and rotational speed data memory means for storing rotational speed data which are respectively set in correspondence with the count values of the plurality of different numbers of times of generation, and representing rotational speeds of the workpiece about the predetermined axis, wherein, every time the number of times of generation of reference timing signals counted by the reference timing signal counting means reaches a given count value, the moving position determining means reads out position data corresponding to the reached count value and a next count value from the position data memory means, divides a difference between the reached count value and the next count value at predetermined timings, and determines moving positions of at least one of the workpiece and the tool at the divided timings on the basis of the readout position data, and every time the number of times of generation of reference timing signals counted by the reference timing signal counting means reaches a given count value, the workpiece rotational speed changing means reads out rotational speed data corresponding to the reached count value from the rotational speed data memory means, and changes the rotational speed of the workpiece about the predetermined axis on the basis of the readout rotational speed data.

Every time the number of times of generation of reference timing signals counted by the reference timing signal counting means reaches a given count value, the moving position determining means reads out position data corresponding to the reached count value and the next count value from the position data memory means. The moving position determining means divides the difference between the reached count value and the next count value at predetermined timings, and determines moving positions of at least one of the workpiece and the tool at the divided timings on the basis of the readout position data. The reached and next count values are respectively set as start and end points, and a machining shape corresponding to the interval between the start and end points is approximated as a linear section. For this reason, the position data memory means suffices to store position data corresponding to the start point (reached count value) and the end point (next count value). The position data memory means need not store all position data related to the machining shape, and the memory capacity for position data in the position data memory means can be greatly reduced.

The rotational speed data memory means suffices to store rotational speed data between the start point (reached count value) and the end point (next count value). The memory capacity for rotational speed data in the rotational speed data memory means can be greatly reduced.

The position data memory means stores position data representing the moving position of at least one of the workpiece and tool. Thus, moving positions of at least one of the workpiece and tool at divided timings can be quickly determined.

Every time the number of times of generation of reference timing signals counted by the reference timing signal counting means reaches a given count value, the workpiece rotational speed changing means reads out rotational speed data corresponding to the reached count value from the rotational speed data memory means, and changes the rotational speed of the workpiece about the predetermined axis on the basis of the readout rotational speed data. The rotational speed of the workpiece about the predetermined axis can be changed with reference to a count value used to determine the moving position of at least one of the workpiece and tool. As a result, the rotational speed of the workpiece about the predetermined axis can be easily changed.

The machine tool driving control apparatus according to the present invention may be characterized in that the count value is defined to set the position data or the rotational speed data set in correspondence with the count value so as to represent a moving position or a rotational speed at a position where a machining shape is changed, including an inflection point, an angular portion, and a curvature change point in the desired shape.

The position at which the machining shape is changed, such as an inflection point, an angular portion, and a curvature change point in the desired shape, is set as a start or end point, so division of a linear portion in the machining shape of the workpiece is suppressed. Hence, the memory capacity for position data in the position data memory means or rotational speed data in the rotational speed data memory means can be more greatly reduced.

The present invention will be fully understood from the following detailed description taken in conjunction with the accompanying drawings, which are merely examples and do not limit the present invention.

The further application range of the present invention will be apparent from the following detailed description. The detailed description and specific cases will represent a preferred embodiment of the present invention, but are merely examples. Various modifications and improvements within the spirit and scope of the present invention will be apparent to those skilled in the art from the following detailed description.

DETAILED DESCRIPTION OF THE PREFERRED EMBODIMENT

A preferred embodiment of a machine tool driving control apparatus according to the present invention will be described in detail below with reference to the accompanying drawings.

Figure 1:
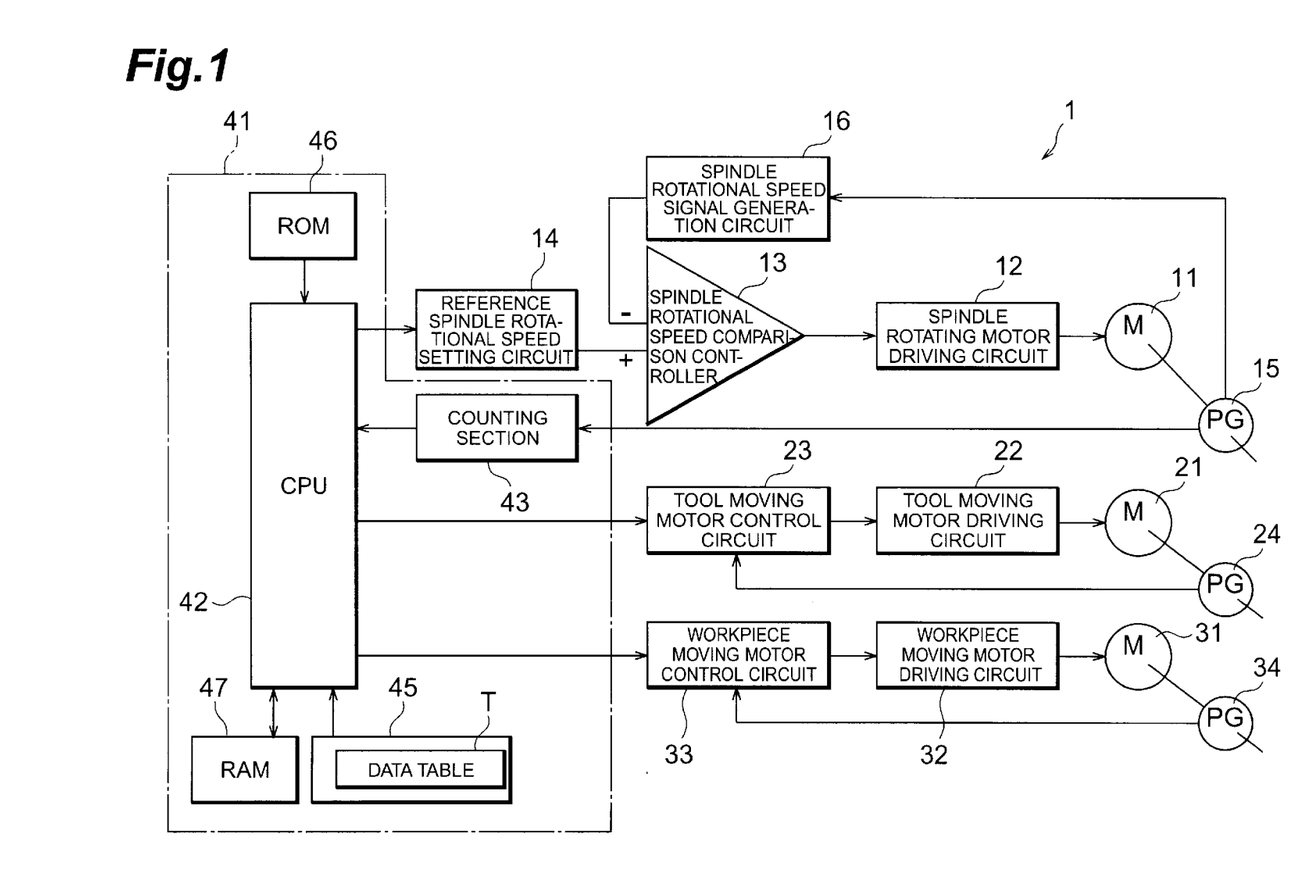
FIG. 1 is a block diagram showing a machine tool driving control apparatus according to the present invention.

FIG. 1 is a block diagram showing a machine tool driving control apparatus according to the present invention. In FIG. 1, a machine tool 1 comprises a spindle rotating motor 11, tool moving motor 21, workpiece moving motor 31, and control unit 41 for controlling driving of the motors 11, 21, and 31.

The spindle rotating motor 11 rotates a spindle (not shown) capable of holding a workpiece. The spindle rotating motor 11 is connected to the control unit 41 via a spindle rotating motor driving circuit 12, spindle rotational speed comparison controller 13, reference spindle rotational speed setting circuit 14, and the like. The spindle rotating motor 11 has a pulse generator 15 (reference timing signal generating means) for detecting rotation of the spindle rotating motor 11. The output of the pulse generator 15 is connected to the control unit 41 and a spindle rotational speed signal generation circuit 16. A pulse signal output from the pulse generator 15 is input to the control unit 41 and spindle rotational speed signal generation circuit 16. The pulse generator 15 generates a pulse signal as a reference timing signal every predetermined rotational angle of the spindle rotating motor 11 (spindle), and outputs the pulse signal to the control unit 41 and spindle rotational speed signal generation circuit 16.

The reference spindle rotational speed setting circuit 14 generates and holds a reference spindle rotational speed signal for determining the rotational speed of the spindle rotating motor 11 (spindle) on the basis of a spindle rotational speed instruction signal output from the control unit 41 (to be described later). The output of the reference spindle rotational speed setting circuit 14 is connected to the "noninverting" terminal of the spindle rotational speed comparison controller 13. A reference spindle rotational speed signal output from the reference spindle rotational speed setting circuit 14 is input to the spindle rotational speed comparison controller 13 ("noninverting" terminal).

The spindle rotational speed signal generation circuit 16 converts a pulse signal output from the pulse generator 15 into a spindle rotational speed signal representing the rotational speed of the spindle rotating motor 11 (spindle). The output of the spindle rotational speed signal generation circuit 16 is connected to the "inverting" terminal of the spindle rotational speed comparison controller 13. The converted spindle rotational speed signal is input to the spindle rotational speed comparison controller 13 ("inverting" terminal).

The spindle rotational speed comparison controller 13 compares the reference spindle rotational speed signal input to the "noninverting" terminal with the spindle rotational speed signal input to the "inverting" terminal, and generates a control signal corresponding to the difference. The control signal generated by the spindle rotational speed comparison controller 13 is output to the spindle rotating motor driving circuit 12.

The spindle rotating motor driving circuit 12 controls supply power to the spindle rotating motor 11 on the basis of the control signal output from the spindle rotational speed comparison controller 13 so as to set the rotational speed of the spindle rotating motor 11 (spindle) to a spindle rotational speed instruction value (to be described later). The spindle rotating motor driving circuit 12, spindle rotational speed comparison controller 13, reference spindle rotational speed setting circuit 14, and spindle rotational speed signal generation circuit 16 constitute a feedback control system for the rotational speed of the spindle rotating motor 11 (spindle).

The tool moving motor 21 moves a tool for machining a workpiece, in a direction (X-axis direction) perpendicular to, e.g., the central rotating axis (predetermined axis) of the spindle rotating motor 11 (spindle). The tool moving motor 21 is connected to the control unit 41 via a tool moving motor driving circuit 22 and tool moving motor control circuit 23. The tool moving motor 21 has a pulse generator 24 for detecting rotation of the tool moving motor 21. The output of the pulse generator 24 is connected to the tool moving motor control circuit 23. A pulse signal from the pulse generator 24 is input to the tool moving motor control circuit 23. The pulse generator 24 generates a pulse signal every predetermined rotational angle of the tool moving motor 21, and outputs the pulse signal to the tool moving motor control circuit 23.

The tool moving motor control circuit 23 recognizes an actual tool moving position on the basis of the pulse signal output from the pulse generator 24. The tool moving motor control circuit 23 compares the recognized actual tool moving position with a tool position instruction signal output from the control unit 41 (to be described later), and generates a tool driving signal based on the comparison result. The tool driving signal generated by the tool moving motor control circuit 23 is output to the tool moving motor driving circuit 22. The tool moving motor driving circuit 22 controls supply power to the tool moving motor 21 on the basis of the tool driving signal output from the tool moving motor control circuit 23. The tool moving motor driving circuit 22 and tool moving motor control circuit 23 constitute a feedback control system for the tool moving position.

The workpiece moving motor 31 moves a workpiece in a direction (Z-axis direction) parallel to, e.g., the central rotating axis of the spindle rotating motor 11 (spindle). The workpiece moving motor 31 is connected to the control unit 41 via a workpiece moving motor driving circuit 32 and workpiece moving motor control circuit 33. The workpiece moving motor 31 has a pulse generator 34 for detecting rotation of the workpiece moving motor 31. The output of the pulse generator 34 is connected to the workpiece moving motor control circuit 33. A pulse signal from the pulse generator 34 is input to the workpiece moving motor control circuit 33. The pulse generator 34 generates a pulse signal every predetermined rotational angle of the workpiece moving motor 31, and outputs the pulse signal to the workpiece moving motor control circuit 33.

The workpiece moving motor control circuit 33 recognizes an actual workpiece moving position on the basis of the pulse signal output from the pulse generator 34. The workpiece moving motor control circuit 33 compares the recognized actual workpiece moving position with a workpiece position instruction signal output from the control unit 41 (to be described later), and generates a workpiece driving signal based on the comparison result. The workpiece driving signal generated by the workpiece moving motor control circuit 33 is output to the workpiece moving motor driving circuit 32. The workpiece moving motor driving circuit 32 controls supply power to the workpiece moving motor 31 based on the workpiece driving signal output from the workpiece moving motor control circuit 33. The workpiece moving motor driving circuit 32 and workpiece moving motor control circuit 33 constitute a feedback control system for the workpiece moving position.

Figure 2:
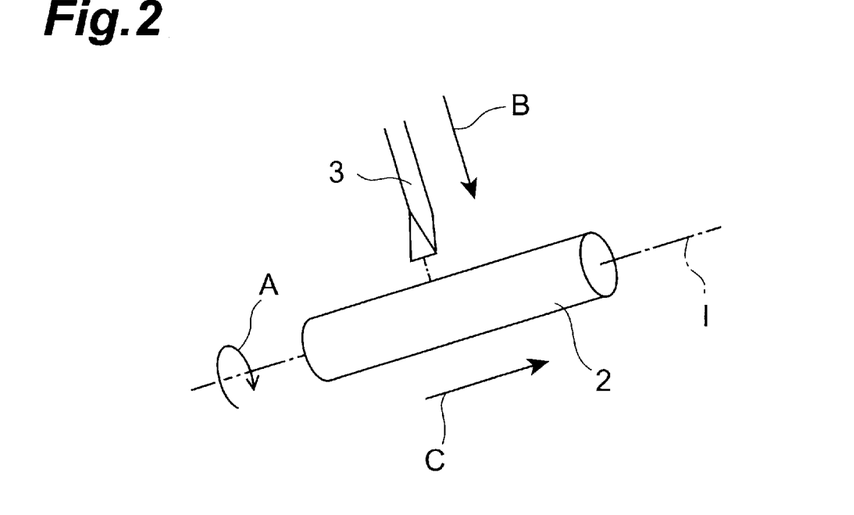
FIG. 2 is a view for explaining an example of machining operation of a workpiece in the machine tool driving control apparatus according to the present invention.

FIG. 2 is a view for explaining an example of machining (cutting) operation of a workpiece 2 in the machine tool 1. As shown in FIG. 2, the shaft-like workpiece 2 is rotated by the spindle rotating motor 11 about a central rotating axis 1 (direction indicated by the arrow A in FIG. 2) of the spindle rotating motor 11 (spindle). At the same time, the workpiece 2 is moved by the workpiece moving motor 31 in a direction (direction indicated by the arrow C in FIG. 2) parallel to the central rotating axis 1 of the spindle rotating motor 11. A tool 3 is moved by the tool moving motor 21 in a direction (direction indicated by the arrow B in FIG. 2) perpendicular to the central rotating axis 1 of the spindle rotating motor 11, and machines the workpiece 2 into a desired shape. Machining operation of the workpiece 2 shown in FIG. 2 is done by a so-called Swiss machine tool. In FIG. 2, the direction indicated by the arrow B is the X-axis direction, whereas the direction indicated by the arrow C is the Z-axis direction.

Referring back to FIG. 1, the control unit 41 comprises a CPU (Central Processing Unit) 42, a counting section 43 as a reference timing signal counting means, a data memory section 45 as a position data memory means and rotational speed data memory means, a ROM 46, a RAM 47, and the like. The CPU 42 is a calculation section for performing entire signal processing of the control unit 41 or the like, and functions as a workpiece rotational speed changing means and moving position determining means.

The counting section 43 is connected to the pulse generator 15. The counting section 43 receives a pulse signal output from the pulse generator 15 via an interface or the like, and counts the number of times of generation of input pulse signals. The counting section 43 is also connected to the CPU 42. The counting section 43 outputs to the CPU 42 the result of counting the number of times of generation of rotation detection signals output from the pulse generator 15.

Figure 3:
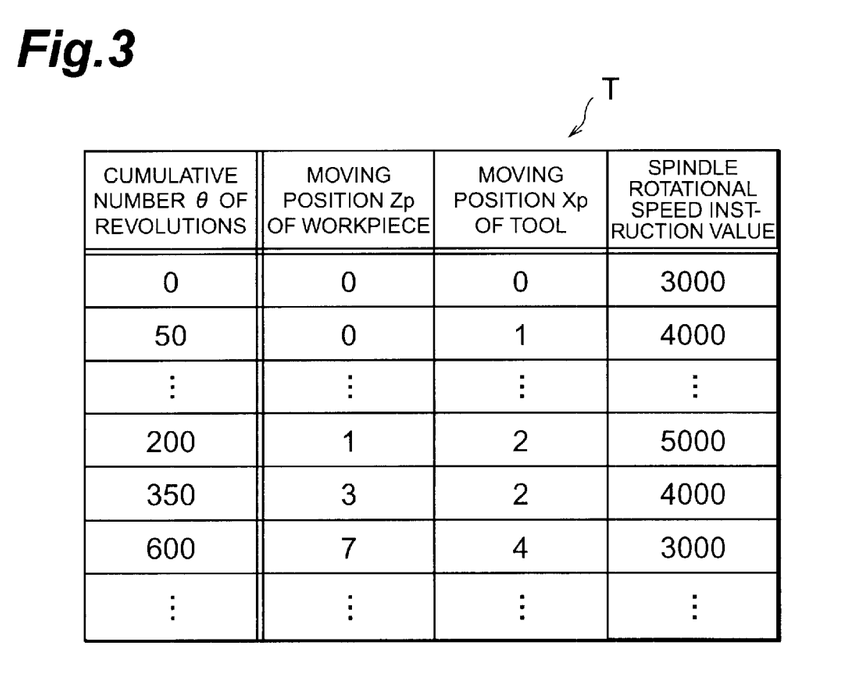
FIG. 3 is a table for explaining the structure of a data table included in the machine tool driving control apparatus according to the present invention.

The data memory section 45 is formed from a memory such as a RAM. The data memory section 45 stores workpiece position data representing the moving position of the workpiece 2, tool position data representing the moving position of the tool 3, and spindle rotational speed data representing the rotational speed of the spindle rotating motor 11 (spindle) in correspondence with each of different count values among count values for the number of times of generation of pulse signals counted by the counting section 43. The data memory section 45 stores the workpiece position data, tool position data, spindle rotational speed data, and the like in a data table T as shown in FIG. 3. In the data table T shown in FIG. 3, not the count value of the number of times of generation of rotation detection signals, but the cumulative number (θ) of revolutions of the spindle rotating motor 11 (spindle) obtained from the count value is used. The count value itself may be used.

In the data table T, as shown in FIG. 3, moving positions (Zp) of the workpiece 2 are set in correspondence with different cumulative numbers (θ) of revolutions, as workpiece position data obtained when the cumulative number (θ) of revolutions of the spindle rotating motor 11 has a predetermined value.

In the data table T, moving positions (Xp) of the tool 3 are set in correspondence with different cumulative numbers (θ) of revolutions, as tool position data obtained when the cumulative number (θ) of revolutions of the spindle rotating motor 11 has a predetermined value. Further, in the data table T, spindle rotational speed instruction values of the spindle rotating motor 11 are set in correspondence with different cumulative numbers (θ) of revolutions, as spindle rotational speed data obtained when the cumulative number (θ) of revolutions of the spindle rotating motor 11 has a predetermined value. For example, when the cumulative number (θ) of revolutions is "200", the moving position (Zp) of the workpiece 2 is "1", the moving position (Xp) of the tool 3 is "2", and the spindle rotational speed instruction value of the spindle rotating motor 11 (spindle) is "5,000". In this fashion, values are set in the data table T.

In the data table T, the moving speed characteristics (not shown) of the workpiece 2 and tool 3 at an interval during which the cumulative number (θ) of revolutions of the spindle rotating motor 11 changes from a predetermined value to a next predetermined value are set as auxiliary operation designation. For example, the moving speed characteristics are set in the data table T such that the moving speeds of the workpiece 2 and tool 3 change in accordance with "sine curve" characteristics while the cumulative number (θ) of revolutions changes from "200" to "350".

The data memory section 45 is connected to the CPU 42. The moving position (Zp) of the workpiece 2 stored in the data memory section 45 is read out as workpiece position data by the CPU 42. The moving position (Xp) of the tool 3 stored in the data memory section 45 is read out as tool position data by the CPU 42. The spindle rotational speed instruction value stored in the data memory section 45 is read out as spindle rotational speed data by the CPU 42.

Figure 6A:
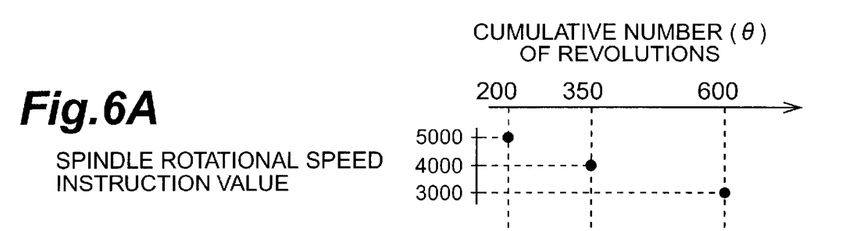
FIG. 6A is a chart for explaining an example of machining operation of the workpiece in the machine tool driving control apparatus according to the present invention, and showing a spindle rotational speed instruction value output to a spindle rotational speed signal generation circuit.
Figure 6B:
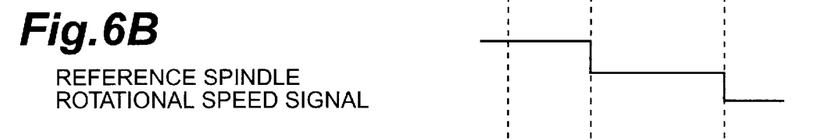
FIG. 6B is a chart for explaining the example of machining operation of the workpiece in the machine tool driving control apparatus according to the present invention, and showing a reference spindle rotational speed signal.
Figure 6C:
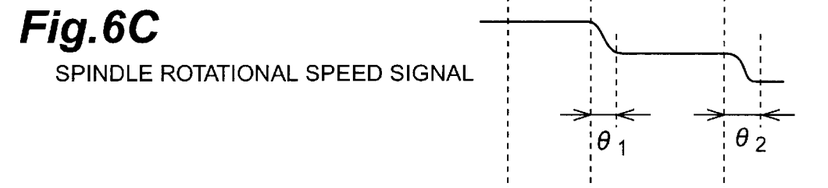
FIG. 6C is a chart for explaining the example of machining operation of the workpiece in the machine tool driving control apparatus according to the present invention, and showing a spindle rotational speed signal.
Figure 6D:
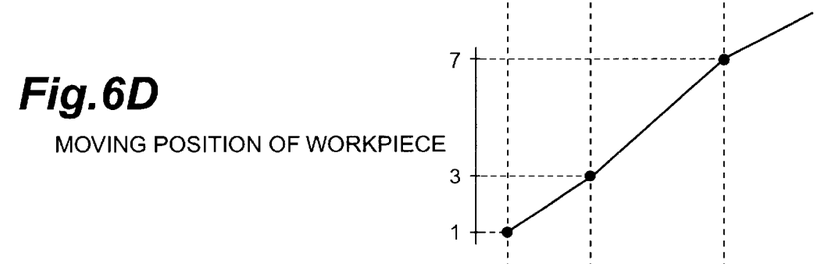
FIG. 6D is a chart for explaining the example of machining operation of the workpiece in the machine tool driving control apparatus according to the present invention, and showing the moving position locus of the workpiece (moving position locus in the Z-axis direction)
Figure 6E:
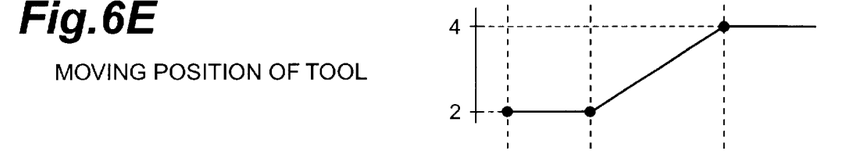
FIG. 6E is a chart for explaining the example of machining operation of the workpiece in the machine tool driving control apparatus according to the present invention, and showing the moving position locus of a tool (moving position locus in the X-axis direction)
Figure 6F:
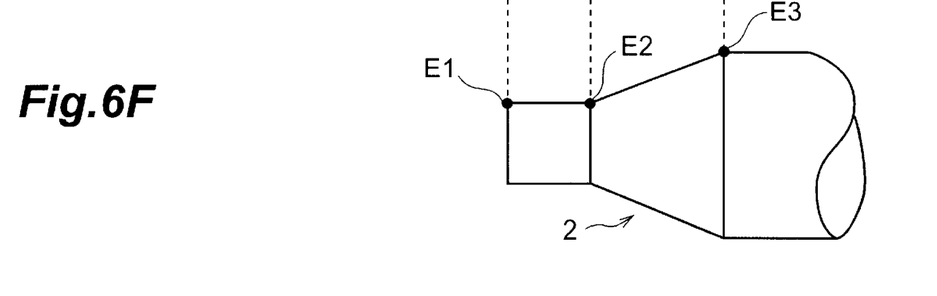
FIG. 6F is a chart for explaining the example of machining operation of the workpiece in the machine tool driving control apparatus according to the present invention, and showing the machined shape of the workpiece.

The data table T shown in FIG. 3 is set to realize the locus of the moving position of the workpiece 2 in the Z-axis direction and that of the tool 3 in the X-axis direction as shown in FIGS. 6D to 6F. FIG. 6D shows the locus of the moving position of the workpiece 2 in the Z-axis direction as a function of the cumulative number (θ) of revolutions of the spindle rotating motor 11 (spindle). While the cumulative number (θ) of revolutions reaches "350" from "200", the workpiece 2 moves from a numerical value "1" to a numerical value "3". While the cumulative number (θ) of revolutions reaches "600", from "350", the workpiece 2 moves from the numerical value "3" to "7". FIG. 6E shows the locus of the moving position of the tool 3 in the X-axis direction as a function of the cumulative number (θ) of revolutions of the spindle rotating motor 11 (spindle). While the cumulative number (θ) of revolutions reaches "350" from "200", the tool 3 does not move from a numerical value "2". While the cumulative number (θ) of revolutions reaches "600" from "350", the tool 3 moves from the numerical value "2" to a numerical value "4".

The workpiece 2 and tool 3 move along the above-described moving position loci, thereby machining (cutting) the workpiece 2 into a shape as shown in FIG. 6F. While the cumulative number (θ) of revolutions reaches "350", from "200", the workpiece 2 is machined from point E1 to point E2 in FIG. 6F. While the cumulative number (θ) of revolutions reaches "600", from "350", the workpiece 2 is machined from point E2 to point E3. In this embodiment, the rotational speed of the spindle rotating motor 11 is held at predetermined values respectively while the cumulative number (θ) of revolutions reaches "350" from "200" (machining section from point E1 to point E2), and reaches "600" from "350" (machining section from point E2 to point E3). The rotational speed of the spindle rotating motor 11 (spindle) can be appropriately set in accordance with the material of the workpiece 2.

In the data table T shown in FIG. 3, the cumulative number (θ) of revolutions of the spindle rotating motor 11 (spindle) at which the moving position (Zp) of the workpiece 2 and the moving position (Xp) of the tool 3 are set is the cumulative number (θ) of revolutions corresponding to a position (E1, E2, E3, or the like) at which the machining shape is changed, such as an inflection point, angular portion, or curvature change point in the machining shape. The moving position (Zp) of the workpiece 2 and the moving position (Xp) of the tool 3 are defined to represent their moving positions at the position (E1, E2, E3, or the like) at which the machining shape is changed. The moving positions are set as a start or end point at the position at which the machining shape is changed, such as an inflection point, angular portion, or curvature change point in a desired shape. This suppresses division of a linear portion in the machining shape of the workpiece 2. As a result, the memory capacity for workpiece position data and tool position data in the data memory section 45 can be greatly reduced.

The ROM 46 is a memory section storing various processing programs, and part of the ROM 46 constitutes a moving speed characteristic memory section which stores moving speed characteristics of the workpiece 2 and tool 3, e.g., "sine curve" characteristics, "uniform motion curve" characteristics, or "uniform acceleration curve" characteristics. Since the moving speed characteristic memory section is constituted in this manner, the moving speeds of the workpiece 2 and tool 3 are controlled in accordance with moving speed characteristics stored in the moving speed characteristic memory section (ROM 46). In machining the workpiece 2, the moving speeds of the workpiece 2 and tool 3 can be properly changed based on moving speed characteristics. Resultantly, the machining accuracy of the workpiece 2 by the tool 3 can be increased.

The RAM 47 readably temporarily stores the results of various calculations in the CPU 42.

Figure 4:
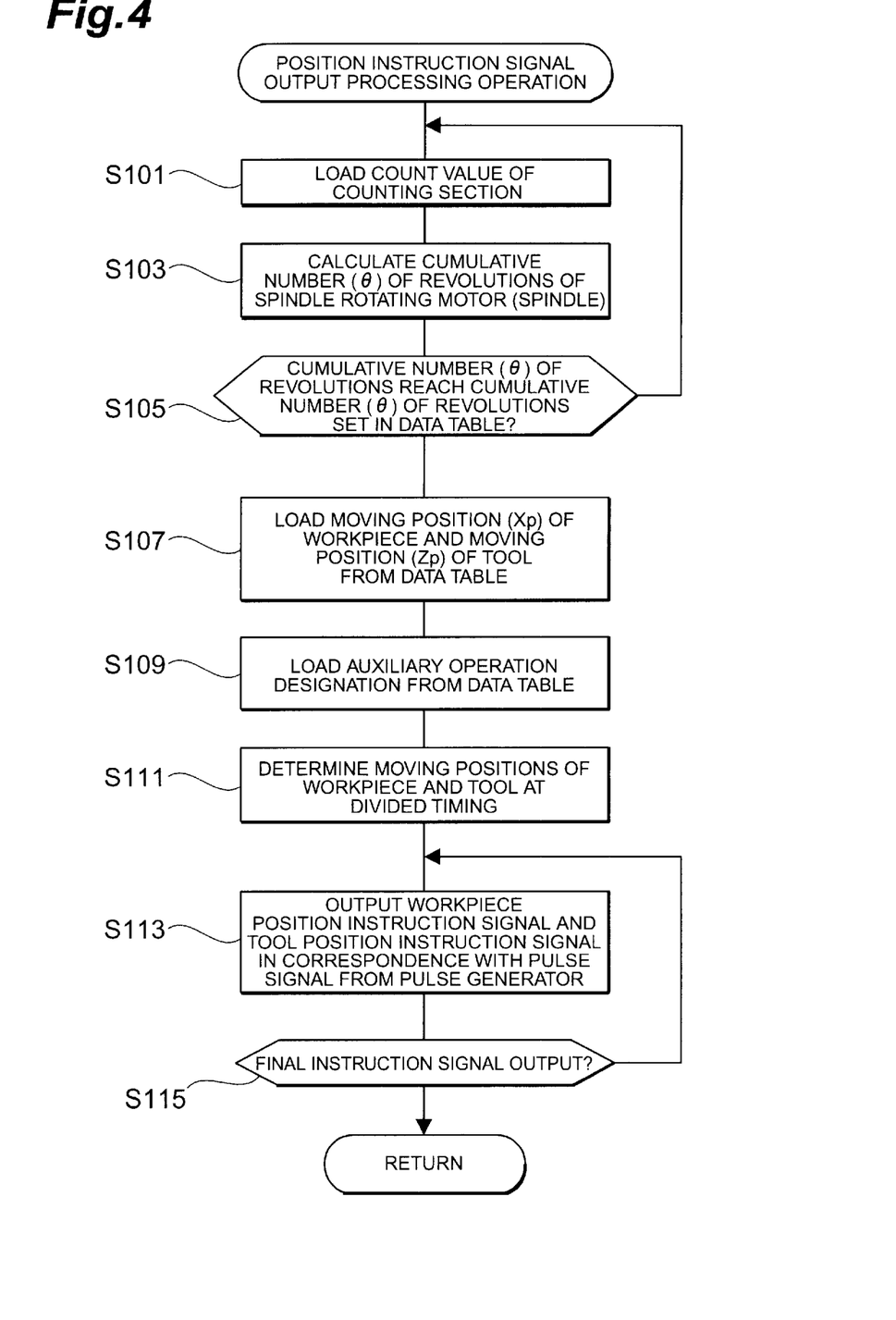
FIG. 4 is a flow chart for explaining output operation processing of a tool position instruction signal and workpiece position instruction signal in a control unit included in the machine tool driving control apparatus according to the present invention.

Output processing operation of a tool position instruction signal and workpiece position instruction signal in the CPU 42 (control unit 41) will be explained with reference to FIG. 4.

In S101, the CPU 42 loads the count value of the counting section 43 attained by counting the number of times of generation of pulse signals output from the pulse generator 15. In S103, the CPU 42 calculates the cumulative number (θ) of revolutions of the spindle rotating motor 11 (spindle) from the loaded count value, and advances to S105. In S105, the CPU 42 checks whether the calculated cumulative number (θ) of revolutions reaches a cumulative number (θ) of revolutions set in the data table T. If the calculated cumulative number (θ) of revolutions reaches the cumulative number (θ) of revolutions set in the data table T ("Yes" in S105), the CPU 42 advances to S107. If the calculated cumulative number (θ) of revolutions does not reach the cumulative number (θ) of revolutions set in the data table T ("No" in S105), the CPU 42 returns to S101.

In S107, the CPU 42 loads from the data table T a moving position (Zp) of the workpiece 2 and a moving position (Xp) of the tool 3 at the reached cumulative number (θ) of revolutions, and a moving position (Zp) of the workpiece 2 and a moving position (Xp) of the tool 3 at the next cumulative number (θ) of revolutions. In S109, the CPU 42 loads a moving speed characteristic from the reached cumulative number (θ) of revolutions to the next cumulative number (θ) of revolutions that is set by an auxiliary operation instruction in the data table T, and reads out the corresponding moving speed characteristic from the moving speed characteristic memory section (ROM 46). As a result, for example, if the cumulative number (θ) of revolutions reaches "200" in the data table T shown in FIG. 3, "1" and "2" are read out as the moving position (Zp) of the workpiece 2 and the moving position (Xp) of the tool 3 that are used when the cumulative number (θ) of revolutions is "200". In addition, "3" and "2" are read out as the moving position (Zp) of the workpiece 2 and the moving position (Xp) of the tool 3 that are used when the next cumulative number (θ) of revolutions is "350". Although not shown in the data table T of FIG. 3, e.g., "sine curve" characteristics are also read out as the moving speed characteristics of the workpiece 2 and tool 3 while the cumulative number (θ) of revolutions changes from "200" to "350".

If the moving position (Zp) of the workpiece 2, the moving position (Xp) of the tool 3, and the moving speed characteristics are loaded in S107 and S109, the CPU 42 shifts to S111, and determines the moving positions of the workpiece 2 and tool 3 at each predetermined divided timing. The moving position of the workpiece 2 is determined as follows. A moving position (Zp) of the workpiece 2 at the reached cumulative number (θ) of revolutions is set as a start point, and a moving position (Zp) of the workpiece 2 at the next cumulative number (θ) of revolutions is set as an end point. Moving positions of the workpiece 2 at respective divided timings of a 4-msec period are determined based on timing signals of the 4-msec period generated by a software timer so as to displace the moving position of the workpiece 2 from the start point to the end point in accordance with a moving speed characteristic set in the data table T. The determined moving positions are temporarily stored in the RAM 47. For example, in the data table T shown in FIG. 3, "3" as a moving position (Zp) of the workpiece 2 when the cumulative number (θ) of revolutions is "350" is set as a start point, and "7" as a moving position (Zp) of the workpiece 2 when the cumulative number (θ) of revolutions is "600" is set as an end point. Moving positions of the workpiece 2 at respective divided timings of the 4-msec period are so determined as to move the workpiece 2 in accordance with a prescribed moving speed characteristic, e.g., "uniform motion curve" characteristic between "3" and "7".

The moving position of the tool 3 is determined as follows. A moving position (Xp) of the tool 3 at the reached cumulative number (θ) of revolutions is set as a start point, and a moving position (Xp) of the tool 3 at the next cumulative number (θ) of revolutions is set as an end point. Moving positions of the tool 3 at respective divided timings of a 4-msec period are determined based on timing signals of the 4-msec period generated by the software timer so as to displace the moving position of the tool 3 from the start point to the end point in accordance with a moving speed characteristic set in the data table T. For example, in the data table T shown in FIG. 3, "2" as a moving position (Xp) of the tool 3 when the cumulative number (θ) of revolutions is "350" is set as a start point, and "4" as a moving position (Xp) of the tool 3 when the cumulative number (θ) of revolutions is "600" is set as an end point. Moving positions of the tool 3 at respective divided timings of the 4-msec period are so determined as to move the tool 3 in accordance with a prescribed moving speed characteristic, e.g., "uniform motion curve" characteristic between "2" and "4".

If the moving positions of the workpiece 2 and tool 3 at respective divided timings of the 4-msec period are determined and stored in the RAM 47, the CPU 42 advances to S113, and outputs to the tool moving motor control circuit 23 a tool position instruction signal representing the moving position of the tool 3 that is determined and stored in the RAM 47. In S113, the CPU 42 outputs to the workpiece moving motor control circuit 33 a workpiece position instruction signal representing the moving position of the workpiece 2 that is determined and stored in the RAM 47. The workpiece position instruction signal and tool position instruction signal are output in correspondence with a pulse signal output from the pulse generator 15. More specifically, it is determined based on a pulse signal output from the pulse generator 15 whether the rotational angle of the spindle rotating motor 11 (spindle) reaches a 4-msec rotational angle of the spindle rotating motor 11 (spindle) at which the rotational speed of the spindle rotating motor 11 (spindle) is constant. If the rotational angle of the spindle rotating motor 11 (spindle) reaches the 4-msec rotational angle of the spindle rotating motor 11 (spindle), the workpiece position instruction signal and tool position instruction signal are output.

In S115, the CPU 42 checks whether a workpiece position instruction signal and tool position instruction signal corresponding to final moving positions among the moving positions of the workpiece 2 and tool 3 that are determined in S111 are output. If a workpiece position instruction signal and tool position instruction signal corresponding to the final moving positions are not output ("No" in S115), the CPU 42 returns to S113. Every time the rotational angle of the spindle rotating motor 11 (spindle) reaches the 4-msec rotational angle of the spindle rotating motor 11 (spindle), workpiece position instruction signals and tool position instruction signals are sequentially output. If a workpiece position instruction signal and tool position instruction signal corresponding to the final moving positions are output ("Yes" in S115), the CPU 42 returns to S101.

Figure 5:
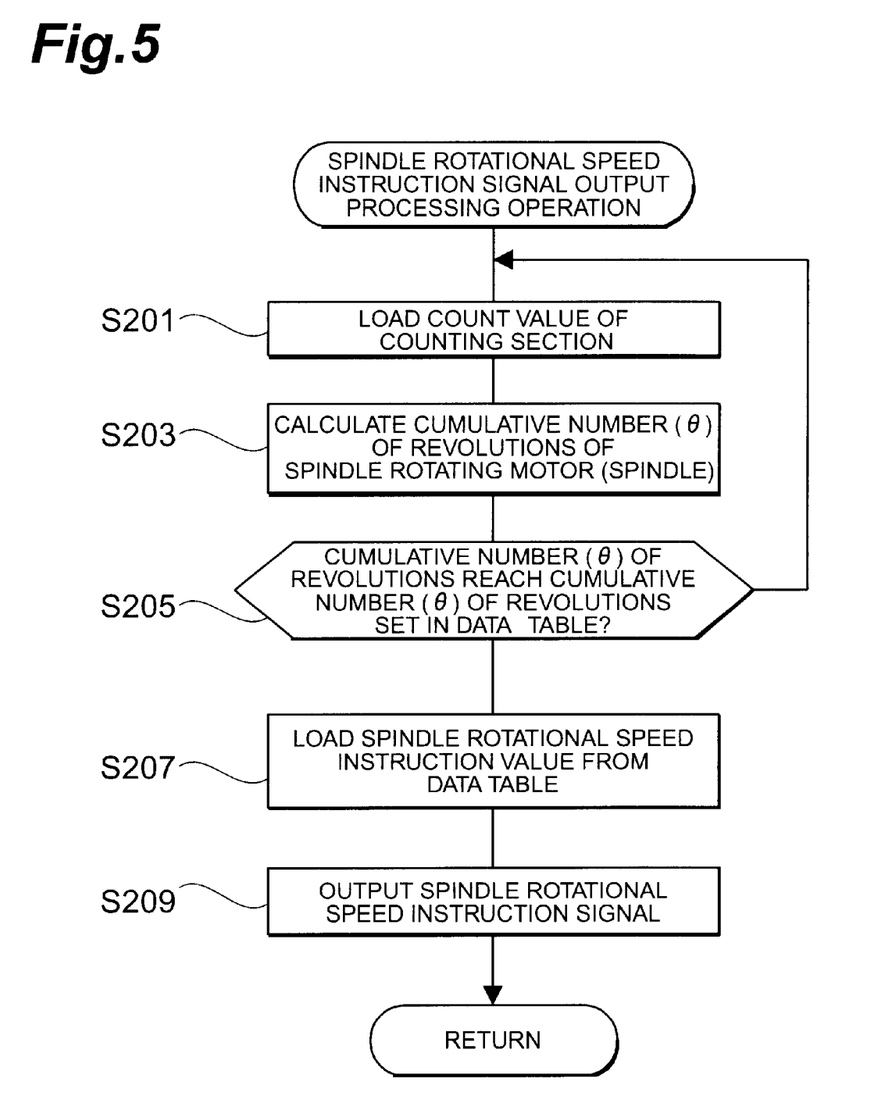
FIG. 5 is a flow chart for explaining output operation processing of a spindle rotational speed instruction signal in the control unit included in the machine tool driving control apparatus according to the present invention.

Output processing operation of a spindle rotational speed instruction signal in the CPU 42 (control unit 41) will be explained with reference to FIG. 5.

In S201, the CPU 42 loads the count value of the counting section 43 attained by counting the number of times of generation of pulse signals output from the pulse generator 15. In S203, the CPU 42 calculates the cumulative number (θ) of revolutions of the spindle rotating motor 11 (spindle) from the read count value, and advances to S205. In S205, the CPU 42 checks whether the calculated cumulative number (θ) of revolutions reaches a cumulative number (θ) of revolutions set in the data table T. If the calculated cumulative number (θ) of revolutions reaches the cumulative number (θ) of revolutions set in the data table T ("Yes" in S205), the CPU 42 advances to S207. If the calculated cumulative number (θ) of revolutions does not reach the cumulative number (θ) of revolutions set in the data table T ("No" in S205), the CPU 42 returns to S201.

In S207, the CPU 42 loads a spindle rotational speed instruction value at the reached cumulative number (θ) of revolutions from the data table T. For example, if the cumulative number (θ) of revolutions reaches "200" in the data table T shown in FIG. 3, "5,000" is read out as a spindle rotational speed instruction value used when the cumulative number (θ) of revolutions is "200". If the spindle rotational speed instruction value at the reached cumulative number (θ) of revolutions is read out, the CPU 42 shifts to S209. The CPU 42 outputs the readout spindle rotational speed instruction value as a spindle rotational speed instruction signal to the reference spindle rotational speed setting circuit 14, and then returns.

An example of machining operation of the workpiece 2 by the tool 3 in the machine tool 1 using the data table T shown in FIG. 3 will be described with reference to FIGS. 6A to 6F.

When the cumulative number (θ) of revolutions of the spindle rotating motor 11 (spindle) reaches "200", the CPU 42 (control unit 41) reads out "5,000" as a spindle rotational speed instruction value, as shown in FIG. 6A, and outputs to the reference spindle rotational speed setting circuit 14 a spindle rotational speed instruction signal representing that the spindle rotational speed instruction value is "5,000". FIG. 6A shows a change in spindle rotational speed instruction value as a function of the cumulative number (θ) of revolutions of the spindle rotating motor 11 (spindle). As shown in FIG. 6B, the reference spindle rotational speed setting circuit 14 generates and holds a reference spindle rotational speed signal for setting the rotational speed of the spindle rotating motor 11 (spindle) to "5,000" on the basis of the spindle rotational speed instruction signal representing that the spindle rotational speed instruction value is "5,000". FIG. 6B shows a change in spindle rotational speed instruction signal as a function of the cumulative number (θ) of revolutions of the spindle rotating motor 11 (spindle). As shown in FIG. 6C, the reference spindle rotational speed signal for setting the rotational speed of the spindle rotating motor 11 (spindle) to "5,000" is input to the spindle rotational speed comparison controller 13 to feedback-control the rotational speed of the spindle rotating motor 11 (spindle) so as to set the rotational speed of the spindle rotating motor 11 (spindle) to "5,000". FIG. 6C shows a change in spindle rotational speed signal as a function of the cumulative number (θ) of revolutions of the spindle rotating motor 11 spindle, i.e., the actual rotational speed of the spindle rotating motor 11 (spindle).

When the cumulative number (θ) of revolutions of the spindle rotating motor 11 (spindle) reaches "200", the CPU 42 (control unit 41) determines moving positions of the workpiece 2 and tool 3 until the cumulative number (θ) of revolutions of the spindle rotating motor 11 (spindle) reaches "350", as described above. Then, the CPU 42 sequentially outputs workpiece position instruction signals and tool position instruction signals. While the cumulative number (θ) of revolutions reaches "350" from "200", the workpiece 2 moves from a numerical value "1" to a numerical value "3", and the tool 3 does not move from a numerical value "2", as shown in FIGS. 6D and 6E.

When the cumulative number (θ) of revolutions of the spindle rotating motor 11 (spindle) reaches "350", the CPU 42 (control unit 41) reads out "4,000" as a spindle rotational speed instruction value, as shown in FIG. 6A, and outputs to the reference spindle rotational speed setting circuit 14 a spindle rotational speed instruction signal representing that the spindle rotational speed instruction value is "4,000". As shown in FIG. 6B, the reference spindle rotational speed setting circuit 14 newly generates and holds a reference spindle rotational speed signal for setting the rotational speed of the spindle rotating motor 11 (spindle) to "4,000" on the basis of the spindle rotational speed instruction signal representing that the spindle rotational speed instruction value is "4,000". The reference spindle rotational speed signal for setting the rotational speed of the spindle rotating motor 11 (spindle) to "4,000" is input to the spindle rotational speed comparison controller 13 to feedback-control the rotational speed of the spindle rotating motor 11 (spindle) so as to set the rotational speed of the spindle rotating motor 11 (spindle) to "4,000". At this time, the spindle rotational speed signal for the cumulative number ($\theta$) of revolutions of the spindle rotating motor 11 (spindle), i.e., the actual rotational speed of the spindle rotating motor 11 (spindle) does not immediately stabilize to "4,000", and after the cumulative number of revolutions exceeds $\theta 1$, converges to "4,000" and stabilizes, as shown in FIG. 6C.

When the cumulative number ($\theta$) of revolutions of the spindle rotating motor 11 (spindle) reaches "350", the CPU 42 (control unit 41) determines moving positions of the workpiece 2 and tool 3 until the cumulative number ($\theta$) of revolutions of the spindle rotating motor 11 (spindle) reaches "600", as described above. Then, the CPU 42 sequentially outputs workpiece position instruction signals and tool position instruction signals. While the cumulative number ($\theta$) of revolutions reaches "600" from "350", the workpiece 2 moves from the numerical value "3" to a numerical value "7", and the tool 3 moves from the numerical value "2" to a numerical value "4", as shown in FIGS. 6D and 6E. The tool 3 machines the workpiece 2 even while the rotational speed of the spindle rotating motor 11 (spindle) changes from "5,000" to "4,000".

Further, when the cumulative number ($\theta$) of revolutions of the spindle rotating motor 11 (spindle) reaches "600", the CPU 42 (control unit 41) reads out "3,000" as a spindle rotational speed instruction value, as shown in FIG. 6A, and outputs to the reference spindle rotational speed setting circuit 14 a spindle rotational speed instruction signal representing that the spindle rotational speed instruction value is "3,000". As shown in FIG. 6B, the reference spindle rotational speed setting circuit 14 newly generates and holds a reference spindle rotational speed signal for setting the rotational speed of the spindle rotating motor 11 (spindle) to "3,000" on the basis of the spindle rotational speed instruction signal representing that the spindle rotational speed instruction value is "3,000". The reference spindle rotational speed signal for setting the rotational speed of the spindle rotating motor 11 (spindle) to "3,000" is input to the spindle rotational speed comparison controller 13 to feedback-control the rotational speed of the spindle rotating motor 11 (spindle) so as to set the rotational speed of the spindle rotating motor 11 (spindle) to "3,000". At this time, the spindle rotational speed signal for the cumulative number ($\theta$) of revolutions of the spindle rotating motor 11 (spindle), i.e., the actual rotational speed of the spindle rotating motor 11 (spindle) does not immediately stabilize to "3,000", and after the cumulative number of revolutions exceeds $\theta 2$, converges to "3,000" and stabilizes, as shown in FIG. 6C.

When the cumulative number ($\theta$) of revolutions of the spindle rotating motor 11 (spindle) reaches "600", the CPU 42 (control unit 41) determines moving positions of the workpiece 2 and tool 3 until the cumulative number ($\theta$) of revolutions of the spindle rotating motor 11 (spindle) reaches the next set cumulative number ($\theta$) of revolutions, as described above. Then, the CPU 42 sequentially outputs workpiece position instruction signals and tool position instruction signals. While the cumulative number ($\theta$) of revolutions reaches the next set cumulative number ($\theta$) of revolutions from "600", the workpiece 2 moves from the numerical value "7" to a numerical value corresponding to the next moving position, and the tool 3 moves from the numerical value "4" to a numerical value corresponding to the next moving position, as shown in FIGS. 6D and 6E. The tool 3 machines the workpiece 2 even while the rotational speed of the spindle rotating motor 11 (spindle) changes from "4,000" to "3,000".

An example of machining operation of the workpiece 2 by the tool 3 in the machine tool 1 will be described with reference to FIGS. 7A to 7F. FIGS. 7A to 7F show machining operation when a groove or the like is formed in the workpiece 2.

Figure 7A:
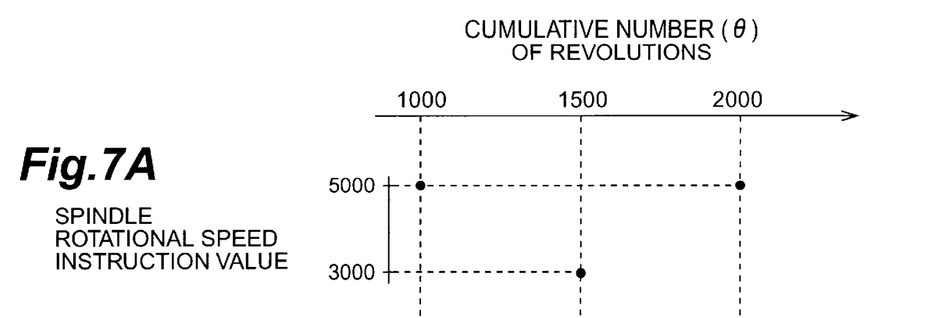
FIG. 7A is a chart for explaining another example of machining operation of the workpiece in the machine tool driving control apparatus according to an embodiment of the present invention, and showing a spindle rotational speed instruction value output to the spindle rotational speed signal generation circuit.
Figures 7B, 7C:
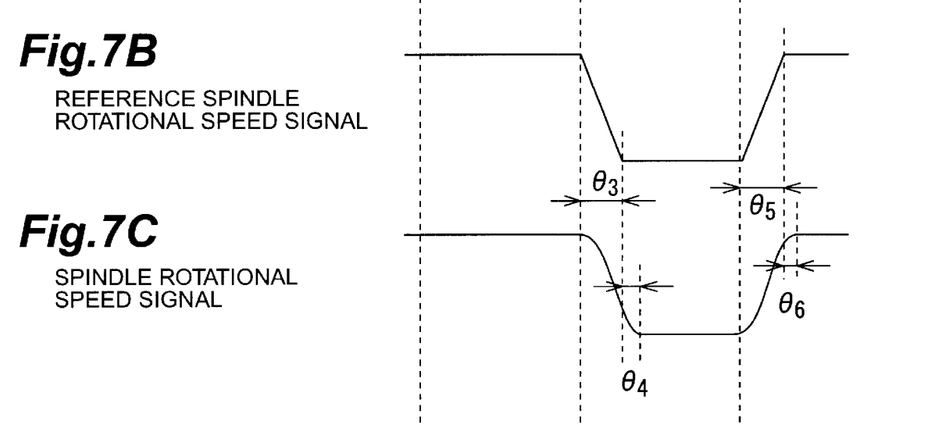
FIG. 7B is a chart for explaining the example of machining operation of the workpiece in the machine tool driving control apparatus according to the embodiment of the present invention, and showing a reference spindle rotational speed signal.
FIG. 7C is a chart for explaining the example of machining operation of the workpiece in the machine tool driving control apparatus according to the embodiment of the present invention, and showing a spindle rotational speed signal.

When the cumulative number ($\theta$) of revolutions of the spindle rotating motor 11 (spindle) reaches "1,000", the CPU 42 (control unit 41) reads out "5,000" as a spindle rotational speed instruction value, as shown in FIG. 7A, and outputs to the reference spindle rotational speed setting circuit 14 a spindle rotational speed instruction signal representing that the spindle rotational speed instruction value is "5,000". FIG. 7A shows a change in spindle rotational speed instruction value as a function of the cumulative number ($\theta$) of revolutions of the spindle rotating motor 11 (spindle). As shown in FIG. 7B, the reference spindle rotational speed setting circuit 14 generates and holds a reference spindle rotational speed signal for setting the rotational speed of the spindle rotating motor 11 (spindle) to "5,000" on the basis of the spindle rotational speed instruction signal representing that the spindle rotational speed instruction value is "5,000". FIG. 7B shows a change in spindle rotational speed instruction signal as a function of the cumulative number ($\theta$) of revolutions of the spindle rotating motor 11 (spindle). As shown in FIG. 7C, the reference spindle rotational speed signal for setting the rotational speed of the spindle rotating motor 11 (spindle) to "5,000" is input to the spindle rotational speed comparison controller 13 to feedback-control the rotational speed of the spindle rotating motor 11 (spindle) so as to set the rotational speed of the spindle rotating motor 11 (spindle) to "5,000". FIG. 7C shows a change in spindle rotational speed signal as a function of the cumulative number ($\theta$) of revolutions of the spindle rotating motor 11 spindle, i.e., the actual rotational speed of the spindle rotating motor 11 (spindle).

Figure 7D:
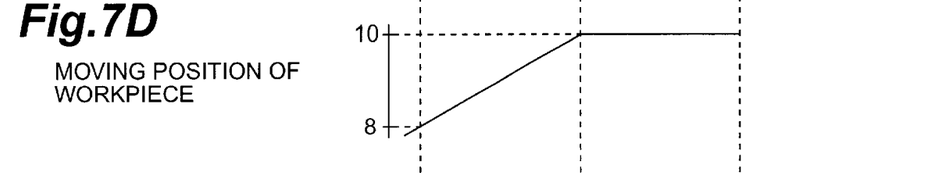
FIG. 7D is a chart for explaining the example of machining operation of the workpiece in the machine tool driving control apparatus according to the embodiment of the present invention, and showing the moving position locus of the workpiece (moving position locus in the Z-axis direction)
Figure 7E:
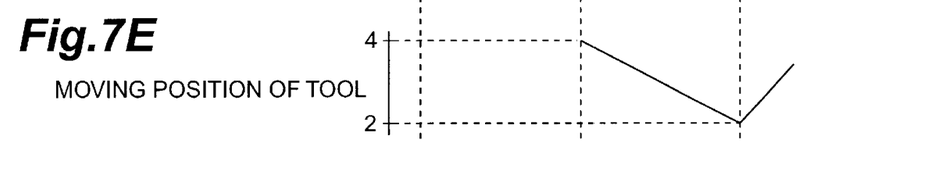
FIG. 7E is a chart for explaining the example of machining operation of the workpiece in the machine tool driving control apparatus according to the embodiment of the present invention, and showing the moving position locus of the tool (moving position locus in the X-axis direction).

When the cumulative number ($\theta$) of revolutions of the spindle rotating motor 11 (spindle) reaches "1,000", the CPU 42 (control unit 41) determines moving positions of the workpiece 2 until the cumulative number ($\theta$) of revolutions of the spindle rotating motor 11 (spindle) reaches "1,500", as described above. Then, the CPU 42 sequentially outputs workpiece position instruction signals. While the cumulative number ($\theta$) of revolutions reaches "1,500" from "1,000", the workpiece 2 moves from a numerical value "8" to a numerical value "10", and is positioned, as shown in FIGS. 7D and 7E.

When the cumulative number ($\theta$) of revolutions of the spindle rotating motor 11 (spindle) reaches "1,500", the CPU 42 (control unit 41) reads out "3,000" as a spindle rotational speed instruction value, as shown in FIG. 7A, and outputs to the reference spindle rotational speed setting circuit 14 a spindle rotational speed instruction signal representing that the spindle rotational speed instruction value is "3,000". The reference spindle rotational speed setting circuit 14 newly generates and holds a reference spindle rotational speed signal for setting the rotational speed of the spindle rotating motor 11 (spindle) to "3,000" on the basis of the spindle rotational speed instruction signal representing that the spindle rotational speed instruction value is "3,000". The reference spindle rotational speed setting circuit 14 is constituted such that, when the spindle rotational speed instruction value greatly changes, the magnitude of the reference spindle rotational speed signal gradually changes to obtain a predetermined acceleration/deceleration characteristic. As shown in FIG. 7B, the magnitude of the reference spindle rotational speed signal gradually decreases until the cumulative number of revolutions exceeds θ3, and after the cumulative number of revolutions exceeds θ3, is held at a magnitude corresponding to the spindle rotational speed instruction signal representing that the spindle rotational speed instruction value is "3,000".

The reference spindle rotational speed signal which changes in the above-mentioned manner is input to the spindle rotational speed comparison controller 13 to feedback-control the rotational speed of the spindle rotating motor 11 (spindle) so as to gradually decrease the rotational speed of the spindle rotating motor 11 (spindle) to "3,000". At this time, the spindle rotational speed signal for the cumulative number (θ) of revolutions of the spindle rotating motor 11 (spindle), i.e., the actual rotational speed of the spindle rotating motor 11 (spindle) does not stabilize to "3,000" immediately after θ3, and after the cumulative number of revolutions exceeds θ4, converges to "3,000" and stabilizes, as shown in FIG. 7C. Note that the rotational speed of the spindle rotating motor 11 (spindle) is decreased from "5,000" to "3,000" in order to set the rotational speed of the workpiece 2 relatively low so as to sufficiently supply cutting fluid to a groove or the like during machining and hold the cutting fluid in the groove in forming the groove or the like in the workpiece 2.

When the cumulative number (θ) of revolutions of the spindle rotating motor 11 (spindle) reaches "1,500", the CPU 42 (control unit 41) determines moving positions of the workpiece 2 and tool 3 until the cumulative number (θ) of revolutions of the spindle rotating motor 11 (spindle) reaches "2,000", as described above. Then, the CPU 42 sequentially outputs workpiece position instruction signals and tool position instruction signals. While the cumulative number (θ) of revolutions reaches "2,000" from "1,500", the tool 3 moves from a numerical value "4" to a numerical value "2", but the workpiece 2 does not move from the numerical value "10". The tool 3 machines the workpiece 2 even while the rotational speed of the spindle rotating motor 11 (spindle) decreases from "5,000" to "3,000".

Further, when the cumulative number (θ) of revolutions of the spindle rotating motor 11 (spindle) reaches "2,000", the CPU 42 (control unit 41) reads out "5,000" as a spindle rotational speed instruction value, as shown in FIG. 7A, and outputs to the reference spindle rotational speed setting circuit 14 a spindle rotational speed instruction signal representing that the spindle rotational speed instruction value is "5,000". As described above, the reference spindle rotational speed setting circuit 14 is constituted such that, when the spindle rotational speed instruction value greatly changes, the magnitude of the reference spindle rotational speed signal gradually changes to obtain a predetermined acceleration/deceleration characteristic. As shown in FIG. 7B, the magnitude of the reference spindle rotational speed signal gradually increases until the cumulative number of revolutions exceeds θ5, and after the cumulative number of revolutions exceeds θ5, is held at a magnitude corresponding to the spindle rotational speed instruction signal representing that the spindle rotational speed instruction value is "5,000".

The reference spindle rotational speed signal which changes in the above manner is input to the spindle rotational speed comparison controller 13 to feedback-control the rotational speed of the spindle rotating motor 11 (spindle) so as to gradually increase the rotational speed of the spindle rotating motor 11 (spindle) to "5,000". At this time, the spindle rotational speed signal for the cumulative number (θ) of revolutions of the spindle rotating motor 11 (spindle), i.e., the actual rotational speed of the spindle rotating motor 11 (spindle) does not stabilize to "5,000" immediately after θ5, and after the cumulative number of revolutions exceeds θ6, converges to "5,000" and stabilizes, as shown in FIG. 7C.

When the cumulative number (θ) of revolutions of the spindle rotating motor 11 (spindle) reaches "2,000", the CPU 42 (control unit. 41) determines moving positions of the workpiece 2 and tool 3 until the cumulative number (θ) of revolutions of the spindle rotating motor 11 (spindle) reaches the next set cumulative number (θ) of revolutions, as described above. Then, the CPU 42 sequentially outputs workpiece position instruction signals and tool position instruction signals. While the cumulative number (θ) of revolutions reaches the next set cumulative number (θ) of revolutions from "2,000", the workpiece 2 moves from the numerical value "10" to a numerical value corresponding to the next moving position, and the tool 3 moves from the numerical value "2" to a numerical value corresponding to the next moving position. The tool 3 machines the workpiece 2 even while the rotational speed of the spindle rotating motor 11 (spindle) increases from "3,000" to "5,000".

In this embodiment, the machine tool 1 comprises the pulse generator 15, and the control unit 41 comprises the counting section 43, data memory section 45, moving speed characteristic memory section (ROM 46), and CPU 42 serving as the workpiece rotational speed changing means and moving position determining means. Every time a cumulative number (θ) of revolutions of the spindle rotating motor 11 (spindle) that is calculated based on pulse signals from the pulse generator 15 counted by the counting section 43 reaches a cumulative number (θ) of revolutions set in the data table T in the data memory section 45, the CPU 42 reads out, from the data memory section 45 (data table T), moving positions (Zp) of the workpiece 2 and moving positions (Xp) of the tool 3 as position data corresponding to the reached cumulative number (θ) of revolutions and the next cumulative number (θ) of revolutions. The CPU 42 reads out moving speed characteristics between the reached cumulative number (θ) of revolutions and the next cumulative number (θ) of revolutions from the moving speed characteristic memory section (ROM 46) in accordance with an auxiliary operation instruction in the data table T. After that, the CPU 42 sets the reached cumulative number (θ) of revolutions as a start point and the next cumulative number (θ) of revolutions as an end point, and divides the interval between the start and end points at predetermined timings. The CPU 42 determines moving positions of the workpiece 2 and tool 3 at divided timings on the basis of the readout moving positions (Zp) of the workpiece 2, the readout moving positions (Xp) of the tool 3, and the readout moving speed characteristics. Accordingly, a machining shape corresponding to the interval between the start point (reached cumulative number (θ) of revolutions) and the end point (next cumulative number (θ) of revolutions) is approximated as a linear section. The data memory section 45 (data table T) suffices to store the moving positions (zp) of the workpiece 2 and the moving positions (Xp) of the tool 3 that respectively correspond to the start and end points, and need not store all position data related to the machining shape. As a result, the memory capacity for position data can be greatly reduced.

The data memory section 45 (data table T) stores the moving position (Zp) of the workpiece 2 and the moving position (Xp) of the tool 3 as position data representing the moving positions of the workpiece 2 and tool 3. Thus, the moving positions of the workpiece 2 and tool 3 at each divided timing can be quickly determined.

Every time a cumulative number (θ) of revolutions of the spindle rotating motor 11 (spindle) that is calculated based on rotation detection signals from the pulse generator 15 counted by the counting section 43 reaches a cumulative number (θ) of revolutions set in the data table T in the data memory section 45, the CPU 42 reads out a spindle rotational speed instruction value as spindle rotational speed data corresponding to the reached cumulative number (θ) of revolutions from the data memory section 45 (data table T). The CPU 42 outputs the readout spindle rotational speed instruction value to the reference spindle rotational speed setting circuit 14, and changes and controls the rotational speed of the spindle rotating motor 11 (spindle).

The moving position (Zp) of the workpiece 2 and the moving position (Xp) of the tool 3 are determined in correspondence with the rotational angle of the spindle rotating motor 11 (spindle) (pulse signal output from the pulse generator 15), as described above. Even while the rotational speed of the spindle rotating motor 11 (spindle) actually changes, the workpiece 2 can be machined without decreasing the machining accuracy of the workpiece 2 by the tool 3. The machine tool 1 can start machine by the tool 3 without waiting until the rotational speed of the spindle rotating motor 11 (spindle) stabilizes to a desired one. Resultantly, machining can be rapidly, efficiently performed to increase the productivity.

As described above, the CPU 42 reads out a spindle rotational speed instruction value from the data memory section 45 (data table T), outputs the readout spindle rotational speed instruction value to the reference spindle rotational speed setting circuit 14, and controls the rotational speed of the spindle rotating motor 11 (spindle). Hence, the rotational speed of the spindle rotating motor 11 (spindle) can be changed with reference to the cumulative number (θ) of revolutions of the spindle rotating motor 11 (spindle) used to determine the moving position (Zp) of the workpiece 2 and the moving position (Xp) of the tool 3. The spindle rotating motor 11 (spindle) can be easily changed.

In this embodiment, a spindle rotational speed instruction value is stored as spindle rotational speed data in the data memory section 45 (data table T) for each cumulative number (θ) of revolutions of the spindle rotating motor 11 (spindle) stored in correspondence with the moving position (Zp) of the workpiece 2 and the moving position (xp) of the tool 3. This can greatly reduce the memory capacity for spindle rotational speed data in the data memory section 45 (data table T).

In the data table T, the cumulative number (θ) of revolutions of the spindle rotating motor 11 (spindle) at which a spindle rotational speed instruction value is set is a cumulative number (θ) of revolutions corresponding to a position (E1, E2, E3, or the like) at which the machining shape is changed, such as an inflection point, angular portion, or curvature change point in the machining shape. The spindle rotational speed instruction value is defined to represent the rotational speed of the spindle rotating motor 11 (spindle) at the above-mentioned position (E1, E2, E3, or the like) at which the machining shape is changed. In this embodiment, therefore, the position at which the machining shape is changed, such as an inflection point, angular portion, or curvature change point in a desired shape is set as a start or end point, so division of a linear portion in the machining shape of the workpiece 2 is suppressed. The memory capacity for rotational speed data in the data memory section 45 can therefore be more greatly reduced.

Note that in this embodiment, only the workpiece 2 may be movable, and the CPU 42 (control unit 41) may determine the moving position of the workpiece 2. Alternatively, only the tool 3 may be movable, and the CPU 42 (control unit 41) may determine the moving position of the tool 3.

In this embodiment, calculation of determining a moving position at a predetermined divided timing may be executed every timing at which an instruction signal is output in output processing operation of a tool position instruction signal and workpiece position instruction signal in the CPU 42 (control unit 41).

In this embodiment, the data memory section 45 (data table T) may store all moving positions (Zp) of the workpiece 2 and moving positions (Xp) of the tool 3 as position data representing the moving positions of the workpiece 2 and tool 3 for respective predetermined rotational angles of the spindle rotating motor 11 (spindle) (pulse signals output from the pulse generator 15). In this case, the memory capacity of the data memory section 45 must be increased, but the CPU 42 need not perform calculation of determining a moving position between start and end points at each predetermined divided timing. The processing ability of the CPU 42 or the like can attain a margin.

In this embodiment, a period in which movement of the workpiece 2 and tool 3 is temporarily stopped to stand by for machining may be set in an initial period in which the rotational speed of the spindle rotating motor 11 (spindle) abruptly changes. Even when the machining standby period is set, this period is much shorter than a conventional standby time. Machining can be rapidly, efficiently performed to increase the productivity.

The machine tool driving control apparatus according to the present invention can machine the workpiece 2 without decreasing the machining accuracy of the workpiece 2 by the tool 3 in all states in which the rotational speed of the spindle rotating motor 11 (spindle) changes, e.g., a state in which rotation of the spindle rotating motor 11 (spindle) starts to accelerate rotation of the spindle rotating motor 11 (spindle) in order to start machining, and a state in which rotation of the spindle rotating motor 11 (spindle) is stopped to decelerate rotation of the spindle rotating motor 11 (spindle) in order to end machining.

It is apparent from the above description of the present invention that the present invention can be variously modified. Such modifications cannot be recognized to depart from the spirit and scope of the present invention, and improvements obvious to those skilled in the art are included in the following claims.

What is claimed is:

1. A machine tool driving control apparatus for rotating a workpiece about a predetermined axis, and moving at east one of said workpiece and a tool for machining said workpiece, thereby machining said workpiece into a desired shape;

said apparatus comprising:

reference timing signal generating means for generating a reference timing signal every predetermined rotational angle wit respect to said predetermined axis;

reference timing signal counting means for counting the number of times of generation of reference timing signals;

position data memory mean for storing position data which are respectively set in correspondence with a plurality of different cumulative numbers of revolutions of said predetermined axis, and representing moving positions of at least one of said workpiece and said tool;

workpiece rotational speed hanging means for changing a rotational speed of the workpiece about said predetermine axis into a predetermined rotational speed; and moving position determining means for determining a moving position of at least one of said workpiece and said tool, wherein, said moving position determining means
loads said number o times of generation of reference timing signals counted by said reference timing signal counting means, calculates cumulative numbers of revolutions of said predetermined axis from said number of times of generation of reference timing signals, every time said calculated cumulative numbers of revolutions of said predetermined axis reach a given value, reads out position data corresponding to said reached cumulative numbers of revolutions of said predetermined axis and next cumulative numbers of revolutions of said predetermined axis from said position data memory means, divides a difference between said reached cumulative numbers of revolutions of said predetermined axis and said next cumulative numbers of revolutions of said predetermined axis at predetermined timings, determines moving positions of at least one of said workpiece and said tool at said divided timings on the basis of said readout position data, and every time said number of times of generation of reference timing signals reaches a given value corresponding to said predetermined timings, outputs said determined moving positions, and wherein even while a rotational speed change in which the rotational speed about the predetermined axis is changed, at least one of the workpiece and the tool is moved on the basis of the moving position determined by said moving position determining means.

2. A machine took driving control apparatus according to claim 1, further comprising:

rotational speed data memory means for storing rotational speed data which are respectively set in correspondence with said plurality of different cumulative numbers of revolutions of said predetermined axis, and representing rotational speeds of said workpiece about the predetermined axis, wherein, every time said calculated cumulative numbers of revolutions of said predetermined axis reaches said given value, said workpiece rotational speed changing means reads out rotational speed data corresponding to said reached cumulative numbers of revolutions of said predetermined axis from said rotational speed data memory means, and changes the rotational speed of said workpiece about said predetermined axis on the basis of said readout rotational speed data.

3. A machine tool driving control apparatus according to claim 2, wherein said cumulative numbers of revolutions of said predetermined axis is defined to set said position data or said rotational speed data set in correspondence with said cumulative numbers of revolutions of said predetermined axis so as to represent a moving position or a rotational speed at a position where a machining shape is changed, including an inflection point, an angular portion, and a curvature change point in the desired shape.

\* \* \* \* \*